May 16, 1939.  W. R. GRISWOLD  2,158,235
MOTOR VEHICLE
Filed Jan. 22, 1937
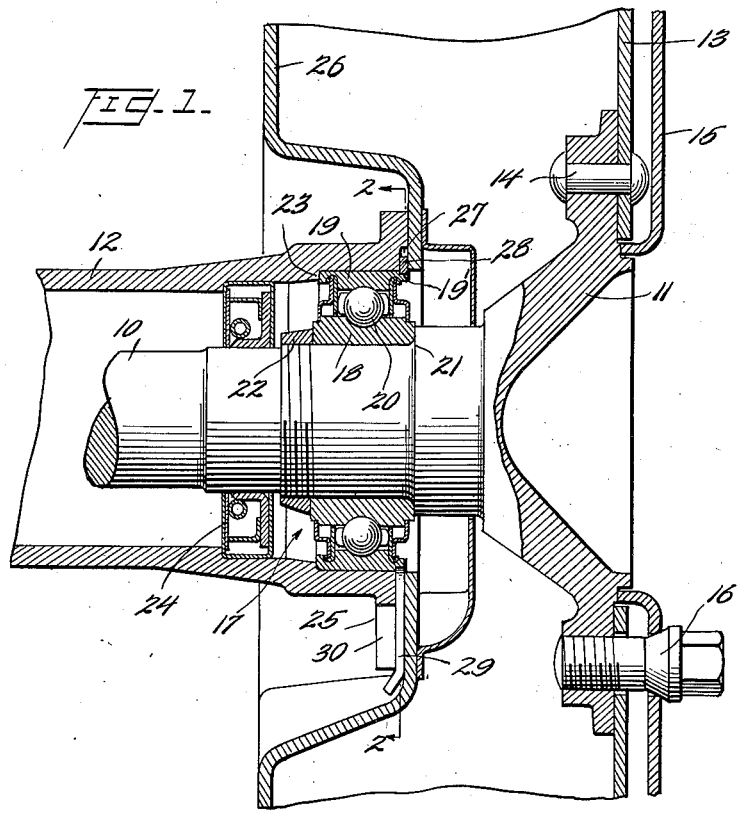
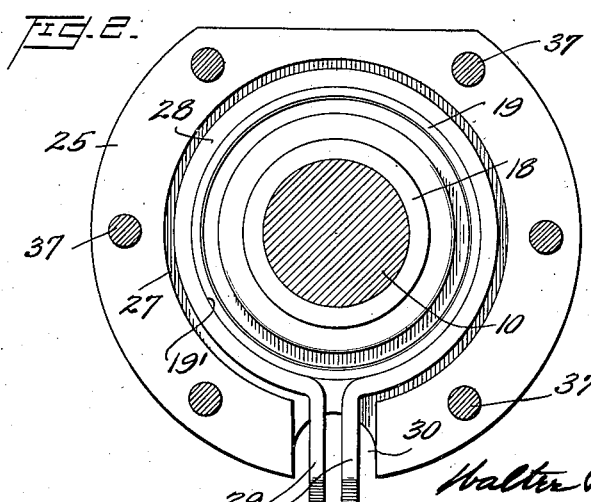
Inventor
Walter R. Griswold,
By Watson, Coit, Morse
+ Grindle
Attorney Patented May 16, 1939

2,158,235

UNITED STATES PATENT OFFICE 2,158,235

MOTOR VEHICLE

Walter R. Griswold, Detroit, Mich., assignor to Packard Motor Car Company, Detroit, Mich., a corporation of Michigan Application January 22, 1937, Serial No. 121,870

13 Claims. (Cl. 308—236)

This invention relates to the mounting of revoluble axles or spindles, and particularly to the rear axles of motor vehicles. Ordinarily, in vehicles of this character, the rear axles are carried in axle housings which extend laterally from the differential housing. The axle is usually supported in a bearing adjacent the outer end of the axle housing, and is provided with a removable hub secured thereto by suitable means. The inner and outer races of the bearing being secured together in any suitable manner, as by their mutual engagement with the balls or other anti-friction elements of the bearing, and the inner bearing race being secured against longitudinal movement on the axle, the axle and bearing may be retained in place by suitable means engaging the outer race of the bearing, to retain it against axial movement outwardly of the axle housing.

In the past it has been usual to employ for this purpose a member bolted to the flanged outer end of the axle housing and surrounding or clamping the outer race of the bearing. Thus, in order to remove the axle and bearing it has been necessary to remove the bolts which secured the retaining member to the axle housing. It is customary to employ these same bolts for securing the brake backing plate to the axle housing, and since the brake backing plate carries a portion of the brake mechanism, it has been necessary to disturb the latter in order to remove a rear axle or its bearing.

The present invention is illustrated in connection with an axle having an integral wheel hub. In the past, in many instances, with an integral construction of this kind, the load upon the axle has been taken by a bearing located at the differential end of the axle, and in order to have access to a bearing so located, it has been necessary to open the differential housing and release the securing means therein, in order to remove the bearing and axle. Because of the fact that the axle is enlarged at the hub end, it is necessary to assemble the bearings on the axle from the small end, and the present invention has for an object the provision of a construction in which the bearing is located at the outer end of the axle housing, the axle and bearing being retained in place by securing means which can be readily released so that the axle and its bearing may with a minimum of difficulty be withdrawn from the axle housing.

A further object of the present invention is the provision of readily accessible axle retaining means which can be manipulated to release the axle and its bearing without in any way disturbing the brake mechanism. Another object is the provision of an extremely simple and compact construction, of inexpensive manufacture and efficient operation.

Other and further objects, features and advantages will be apparent from the description which follows, together with the accompanying drawing, in which:

Figure 1 is a longitudinal vertical section through an axle mounting in accordance with the present invention; and Figure 2 is a transverse vertical section on line 2—2 of Figure 1.

In order to facilitate an understanding of the invention, reference is made to the embodiment thereof shown in the accompanying drawing and detailed descriptive language is employed. It will, nevertheless, be understood that no limitation of the invention is thereby intended and various changes and alterations are contemplated such as would ordinarily occur to one skilled in the art to which the invention relates.

In the construction illustrated in the drawing, an axle 10, provided with a wheel hub 11, formed integrally therewith, is carried centrally of an axle housing 12. The usual brake drum 13 is secured to the hub 11 by rivets 14 or other suitable means, while the wheel disc 15 is likewise secured to the hub 11 by means of the usual bolts 16. An anti-friction bearing 17 is mounted between the axle 10 and axle housing 12, and comprises an inner race 18, outer race 19, and a plurality of anti-friction elements such as the balls 20. The inner race 18 is clamped against a shoulder 21 formed on the axle 10, by means of a threaded retaining element 22 or other suitable means. The outer race 19 of the bearing 17 is retained against a shoulder 23, formed internally of the axle housing 12, by readily retractible means hereinafter described. The numeral 24 designates the usual oil seal, which forms no part of the present invention.

The axle housing 12 is provided at its outer end with an integral flange 25, to which the brake backing plate 26 is secured by bolts 37 (Figure 2). The flange 25 of the axle housing is formed with an annular recess to provide, in conjunction with the inner edge of the brake backing plate 26, an annular groove 27 which receives split ring 28, the latter being normally in its contracted state, and being expansible for releasing the axle as hereinafter described. When the various parts are in assembled position, the split ring 28, in its contracted state, seats on an annular shoulder 19' provided on the outer end surface of the outer race 19 of bearing 17, and serves to retain the latter against outward movement away from the shoulder 23 of the axle housing. Since the respective races of the bearing 17 are incapable of substantial relative movement longitudinally of the axle, and since the inner race 18 is secured in place upon the axle 10, as above described, it will be obvious that when the split ring 28 occupies the position shown in Figure 1, the axle 10 and bearing 17 are positively retained in place within the axle housing 12.

It will be noted that the annular shoulder 19' of the race 19 serves to center the split ring 28 in its contracted position, preventing lateral movement thereof, and thus maintaining it at all times in engagement, throughout its effective circumference, with the groove 27, thus providing a safe and efficient means of retaining the axle and bearing in place.

It will be apparent that other suitable arrangements might be employed for maintaining the ring 28 centered in an overlapping relation with the race 19 and at all times engaged against outward movement relative to the axle housing 12. For example, the ring 28 might be formed with a laterally projecting flange adapted to center upon a corresponding flange or shoulder formed upon the extreme outer end of the axle housing, or upon the inner face of the brake backing plate, the inner portion of the ring 28, in either case, being adapted to overlie the end of the race 19 when the ring is in its normally contracted condition.

The split ring 28 is preferably provided with downwardly extending projections 29, adapted to receive therebetween a suitable tool for expanding the ring 28, the flange 25 of the axle housing being formed with a cove 30 to facilitate the insertion of such a tool between the projections 29. It will be obvious that when a suitable tool is inserted as described, and manipulated to spread apart the projections 29, the ring 28 will be expanded into the groove 27, permitting the axle 10 and bearing 17 to be withdrawn as a unit from the axle housing 12. In performing this operation, it will be unnecessary to remove the brake band or wheel from the hub, or to remove the bolts 37 or disturb the brake mechanism in any way. After the desired inspection or repair has been completed, the axle and bearing may be replaced in the axle housing by expanding the ring 28, moving the axle and bearing axially into position, and permitting the ring 28 to contract into the position illustrated.

Having thus described the invention, what is claimed as new and desired to be secured by Letters Patent is:

1. In an axle mounting for motor vehicles, an axle housing, an axle mounted therein, a brake backing plate carried by said axle housing, an anti-friction bearing between said axle and said axle housing, means for retaining said bearing against longitudinal movement on said axle, and readily retractible means for securing said bearing against outward longitudinal movement in said axle housing, said retractible means being accessible from the inner side of said brake backing plate for release of said bearing.

2. In an axle mounting for motor vehicles, an axle housing, an axle mounted therein, a brake backing plate carried by said axle housing, an anti-friction bearing between said axle and said axle housing, means for retaining said bearing against longitudinal movement on said axle, an internal shoulder on said axle housing, and readily retractible means associated with said axle housing for retaining said bearing against said shoulder, said retractible means being accessible from the inner side of said brake backing plate for release of said bearing.

3. In an axle mounting for motor vehicles, an axle housing, an axle mounted therein, a brake backing plate carried by said axle housing, an anti-friction bearing between said axle and said axle housing, means for retaining said bearing against longitudinal movement on said axle, and expansible means normally adapted to secure said bearing against outward longitudinal movement in said axle housing, said expansible means being accessible from the inner side of said brake backing plate for expansion to release said bearing.

4. In an axle mounting for motor vehicles, an axle housing, an axle mounted therein, an anti-friction bearing between said axle and said axle housing, means for retaining said bearing against longitudinal movement on said axle, and retractible means associated with said axle housing and normally adapted to overlie the outer end of said bearing.

5. In an axle mounting for motor vehicles, an axle housing, an axle mounted therein, a brake backing plate carried by said axle housing, an anti-friction bearing between said axle and said axle housing, means for retaining said bearing against outward longitudinal movement on said axle, an internal shoulder on said axle housing, and an expansible split ring associated with said axle housing for retaining said bearing against said shoulder, said ring being accessible from the inner side of said brake backing plate.

6. In an axle mounting for motor vehicles, an axle housing, an axle mounted therein, an anti-friction bearing between said axle and said axle housing, means for retaining said bearing against longitudinal movement on said axle, an internal shoulder on said axle housing, and an expansible split ring associated with said axle housing and normally adapted to overlie the outer end of said bearing.

7. In an axle mounting for motor vehicles, an axle housing having an internal shoulder and an annular recess, an axle mounted in said housing, a brake backing plate carried by said axle housing, a bearing surrounding and mounted on said axle, the inner end of said bearing being adapted to engage said shoulder on said axle housing, and expansible means associated with said recess and adapted normally to overlie the outer end of said bearing, said last named means being capable of expanding into said recess to permit withdrawal of said axle and bearing from said axle housing and being accessible for contraction from the inner side of said brake backing plate.

8. In an axle mounting for motor vehicles, an axle housing, an axle mounted therein, an anti-friction bearing between said axle and said axle housing, means for retaining said bearing against longitudinal movement on said axle, and an expansible split ring associated with said axle housing and normally adapted to overlie the outer end of said bearing, said ring having readily accessible projections adapted for the insertion of an expanding tool therebetween.

9. In an axle mounting for motor vehicles, an axle housing having an internal shoulder and an annular recess, an axle mounted in said housing, a bearing surrounding and mounted on said axle, the inner end of said bearing being adapted to engage said shoulder on said axle housing, and expansible means associated with said recess and adapted normally to overlie the outer end of said bearing, said last named means being capable of expanding into said recess to permit withdrawal of said axle and bearing from said axle housing, and having readily accessible projections adapted for engagement by an expanding tool.

10. In an axle mounting for motor vehicles, an axle housing having an annular outwardly projecting flange at its outer end and having an internal annular shoulder spaced from said outer end, an axle mounted therein and having an integral wheel hub, said axle having an annular shoulder formed thereon approximately in the plane of the outer end of said axle housing, an anti-friction bearing on said axle, comprising inner and outer races and interposed anti-friction elements, removable means for clamping said inner race against said shoulder on said axle, an expansible member adapted normally to overlie said outer race and retain it against said shoulder on said axle housing, and an annular member secured to said flange on said axle housing and providing therewith an internal annular groove for receiving said expansible member, said latter member being capable of expanding into said groove to permit withdrawal of said axle and bearing from said axle housing.

11. In an axle mounting for motor vehicles, an axle housing, an axle mounted therein, an anti-friction bearing between said axle and said axle housing, means for retaining said bearing against longitudinal movement on said axle, and an annular member associated with said axle housing and normally overlapping a peripheral portion of the outer end of said bearing, said annular member being expansible out of overlapping engagement with said bearing.

12. In an axle mounting for motor vehicles, an axle housing, an axle mounted therein, an anti-friction bearing between said axle and said axle housing, means for retaining said bearing against longitudinal movement on said axle, an annular member associated with said axle housing and normally overlapping a peripheral portion of the outer end of said bearing, said annular member being expansible out of overlapping engagement with said bearing, and means for centering said annular member relative to said bearing when said annular member is in its normally contracted state.

13. In an axle mounting for motor vehicles, an axle housing, an axle mounted therein, an antifriction bearing between said axle and said axle housing, said bearing having an annular projection upon its outer end, and an annular member associated with said axle housing and normally adapted to overlap said bearing and to seat upon said annular projection, said annular member being expansible out of overlapping engagement with said bearing.

WALTER R. GRISWOLD.